No. 608,369. Patented Aug. 2, 1898.
A. LEVEDAHL.
BICYCLE CRANK SHAFT.
(Application filed Oct. 1, 1896.)
(No Model.)
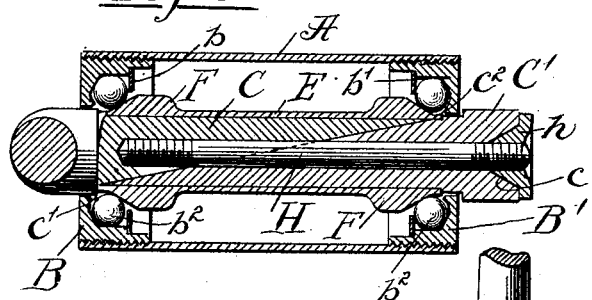
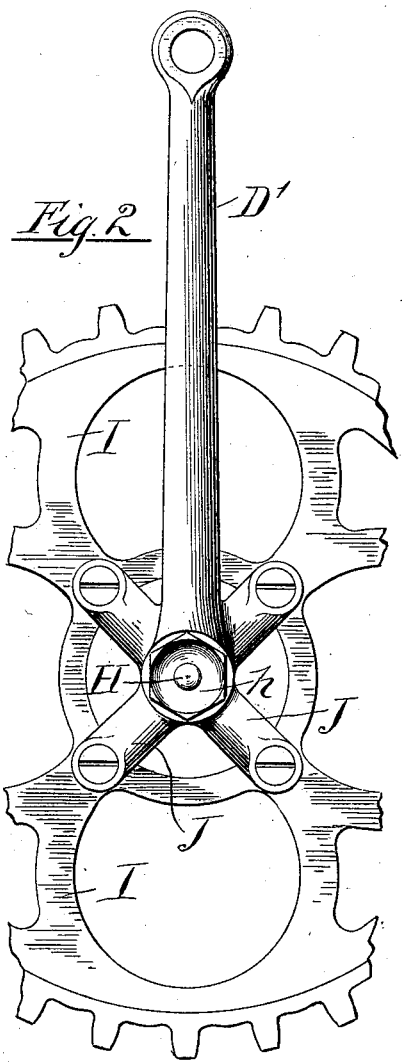
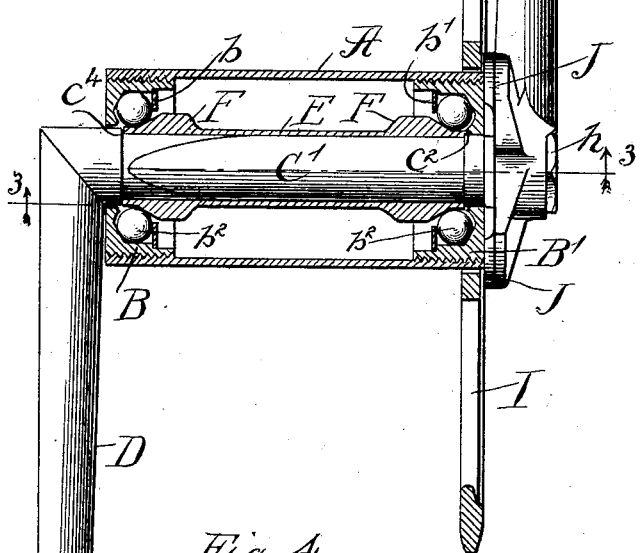
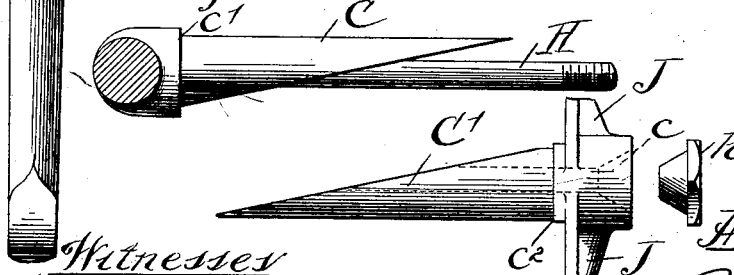
Witnesses
L. Clinton Hamlink
Harold G. Barritt
Inventor
Axel Levedahl
by Poole & Brown
his Attorneys

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

BICYCLE CRANK-SHAFT.

SPECIFICATION forming part of Letters Patent No. 608,369, dated August 2, 1898.

Application filed October 1, 1896. Serial No. 607,568. (No model.)

*To all whom it may concern:*

Be it known that I, AXEL LEVEDAHL, of Aurora, in the county of Kane and State of Illinois, have invented certain new and useful Improvements in Bicycle Crank-Shafts; and I do hereby declare that the following is a full, clear, and exact description thereof, reference being had to the accompanying drawings, and to the letters of reference marked thereon, which form a part of this specification.

This invention relates to improvements in crank-shafts and bearings for bicycles, having reference more especially to features of construction by which the crank-arms may be made integral with the parts of the crank-shaft to which they are attached, while at the same time the crank-shaft may be easily removed from its bearings for purposes of inspection, renewal, or repair.

The invention consists in the matters hereinafter described, and pointed out in the appended claim.

In the accompanying drawings, Figure 1 is a view in side elevation of a crank shaft and hanger embodying my invention, the hanger and bearings being shown in transverse section and the crank-shaft in side view. Fig. 2 is an end view of the crank-shaft, showing the sprocket-wheel in side elevation. Fig. 3 is a longitudinal section of the hanger and shaft, taken on line 3 3 of Fig. 1. Fig. 4 is a view in side elevation of the two sections of the shaft separated from each other.

As illustrated in said drawings, A indicates a tubular crank-hanger, such as is ordinarily used in bicycle construction and which is provided at its ends with two removable rings B B', which constitute the outer annular members of the ball-bearings. Said rings B B' are shown as having a screw-threaded connection with the ends of the hanger by means of internal screw-threads on the hanger and external screw-threads on the rings.

C C' indicate the parts or sections constituting the crank-shaft, and D D' two crank-arms, one of which, D, is permanently attached to or made integral with the shaft-section C and the other of which, D', is similarly attached to or made integral with the shaft-section C'. The adjacent ends of the shaft-sections are overlapped and each is tapered at its inner end or provided with an oblique or beveled flat surface for contact with the other part, so that when the parts are placed together they will form a straight axle, the overlapping parts of which are gradually reduced in size from the full size of the axle to the narrow or thin inner extremity of the same. The oblique joint thus formed by the two parts of the axle extends the entire length of the sleeve E or to points beneath the cones F and is covered by the tube or sleeve E, adapted to fit closely around the same, and thus hold the shaft-sections closely in contact and rigidly in alinement with each other. Said sleeve E has a smooth cylindrical interior surface and carries at its ends the inner annular parts or cones F F of the ball-bearings, the same being permanently attached thereto and, as herein shown and preferably constructed, made in one piece or integral therewith.

One of the shaft-sections, in this instance the section C', is made hollow or tubular, and a rod or stem H, which is rigidly attached to and projects from the beveled or tapered end of the other shaft-section C, extends through the tubular section C' and is provided at its outer end with securing means adapted to engage the tubular section, and thereby hold the sections together and from relative endwise movement. The securing means illustrated consists of a nut $h$, applied to the screw-threaded stem and bearing against the outer end of the tubular shaft-section. In order to secure a smooth and compact construction of the parts, the nut $h$ is countersunk in the end of the shaft, the latter being provided with a recess $c$, in which the said end fits and which it enters to nearly its full depth, so as to leave the end of the nut flush with the outer surface of the crank-arm. Said nut is shown as made of conical form and the recess C of corresponding shape; but this particular construction while desirable is not essential. The rod or stem H may be secured to the shaft-section to which it is attached or of which it forms a part in any suitable or convenient manner. Preferably, however, the shaft-section C is provided with a screw-threaded axial socket adapted to receive the screw-threaded end of the stem.

The sleeve E, while being fitted closely over the adjacent ends of the shaft-sections, is secured thereto or is held in place or restrained from endwise movement thereon by the wedging action of the aforesaid shaft-section C C' throughout substantially the entire length of the sleeve E, the wedging strain aforesaid being produced by the action of the stem H, the nut $h$, and the tapered shaft-section C C', the inwardly-facing shoulders $c'$ $c^2$ on the shaft-sections being adapted to permit the necessary freedom of adjustment of the said shaft-sections C C' to the said sleeve E.

The external bearing-rings B B' are shown as provided with ball holding or caging rings $b$ $b'$, by which the balls $b^2$ are held in place and prevented from dropping out at the time of taking the bearings apart.

I indicates the sprocket-wheel, which is made separate from the shaft and secured thereto by means of integral radial arms J on the shaft-section C', to which arms the sprocket-wheel is secured by bolts or screws. Said arms are arranged nearly in the same plane with the crank-arm D, but are offset or extended inwardly to bring the sprocket-wheel nearly over or around the adjacent ball-bearing, as heretofore common in bicycles.

The operation of assembling the parts or taking out the same obviously may be accomplished very easily and quickly.

In assembling the parts the external rings B B' will first be slipped over the inner ends of the axle-sections, the sleeve then slipped over one of the sections and the two parts of the axle inserted through the hanger from opposite sides thereof, with their tapered ends overlapping within the sleeve, the stem H at the same time being inserted through the tubular section. When the overlapping ends of the axle are brought together, the nut is applied to the outer end of the stem H, so as to draw the tapering or beveled ends of the shaft-sections closely together and at the same time wedge them tightly together within the sleeve. The outer bearings are then inserted in the ends of the hanger. When the parts of the shaft are brought together, the sleeve will be held rigidly from endwise movement by the clamping action of the two wedge-shaped shaft-sections on the sleeve surrounding them, while at the same time the cones on the ends of said sleeve will be firmly and rigidly clamped on the shaft, the expansive action of the end portions of the tapered sections, which act directly on said cones or the ends of the sleeves to which the cones are attached, so that the cones will be held in place largely by direct engagement of the shaft-sections therewith. The external bearing-rings will of course be adjusted in the ends of the hanger, so as to bring them into proper bearing relation with the cones on the ends of the sleeve. When it is desired to remove the crank-shaft, it is merely necessary to unscrew the nut $h$, so as to release the parts of the crank-shaft, after which both parts may be taken out by the detachment of the external bearing-rings.

The employment of the tapered or overlapping shaft-sections in connection with the surrounding sleeve obviously affords a joint which is of great strength and rigidity and one which at the same time admits of easy and convenient separation of the parts of the shaft.

I claim as my invention—

The combination with a crank-shaft hanger and external, inwardly-facing bearing-rings adjustably secured thereto, of a crank-shaft consisting of two sections each provided with an integral crank-arm and having tapered overlapping ends, one of the said sections being tubular, a sleeve having a smooth cylindric interior surface, surrounding the overlapping parts of the shaft and having at its ends outwardly-facing permanently-attached bearing-cones within which the said overlapping parts of the shaft extend and a rod or stem which passes through the tubular section and is secured in the other section, said rod or stem being provided with a clamping-nut acting against the outer end of the tubular section and by which the tapered parts may be forced together and tightened within the sleeve which surrounds the same.

In testimony that I claim the foregoing as my invention I affix my signature, in presence of two witnesses, this 11th day of September, A. D. 1896.

AXEL LEVEDAHL.

Witnesses:
C. CLARENCE POOLE,
WILLIAM L. HALL,